United States Patent Office

3,340,692
Patented Sept. 12, 1967

3,340,692
METHOD OF ERECTING SUPPORTS AND ROOFS OVER WATER FOR LIQUIFIED GAS STORAGE
John C. St. Clair, Box 333, Rte. 2,
London, Ohio 43140
No Drawing. Filed Oct. 28, 1965, Ser. No. 505,575
4 Claims. (Cl. 61—.5)

This patent relates to a method of erecting internal supports for roofs for storage zones, such as ponds or lakes, that will rest on frozen earth and will be used to store liquified natural gas.

More particularly this patent relates to the temporary putting of or having water in an above storage zone and erecting, to support a roof, flexible supports resting on the bottom of the storage zone, by the help of at least one man in a boat on the water.

I define liquified natural gas as any liquid in which the sum of the weights of the methane and ethane contained is more than 65% of the weight of the liquid.

The use of natural gas is mostly in the winter time for the heating of houses. However, it is very desirable to keep the gas producing wells and the usually very long pipe lines carrying the gas to the cities, where the gas is to be used, operating at full capacity the year around. As a result there has been very great interest in ways of storing natural gas, received by a city in the summertime, for use in the wintertime.

One method on which considerable work has been done by others for over 25 years is the storage of natural gas in liquified form. When natural gas is cooled to about $-260°$ F. (260 degrees below zero Fahrenheit) it changes into a liquid that boils at atmospheric pressure and has $1/600$ of the volume of the original gas at atmospheric temperature and pressure.

The liquification of natural gas does not involve any difficult problems and is quite cheap when carried out on a large scale. However the volume of the vessel needed for storing liquified natural gas must be very large and to make such storage attractive the storage vessel must be very cheap. Others before me have not been able to devise a very cheap storage vessel for storing liquified natural gas.

Others have found that frozen earth makes a good barrier for liquified natural gas. As a result holes in the ground with frozen bottoms and walls have been successfully tried out for storing liquified natural gas. However, there has not been previously developed a cheap method of making an insulated roof for the storage holes. In the past arched roofs have been used over the storage holes. These roofs have not only been expensive but they are limited as to the sizes of the storage holes they can cover. In fact directly on indirectly the cost of the roof has been over 75% the cost of this type of storage in the past.

For a roof of considerable size and of not too great a height a roof supported by supports directly under the roof and in the zone the roof covers is much the cheapest to build. However, this type of supports (called internal supports) must withstand the contraction and expansion imposed on it by the very cold temperature of liquified natural gas in two ways.

First, the very cold liquified natural gas keeps freezing the soil under the bottom of the storage zone. The above mentioned internal supports must rest on this frozen layer of soil which keeps getting continually frozen deeper into the ground at least during a long initial period. As a result this frozen soil on which the supports must rest is subject to heaving or uneven moving due to the expansion of the soil when it freezes.

Second, there is also sideways contraction to consider for the internal supports. It is desirable to make the storage zone or lake at least 300 feet across, and a roof of this width will contract as much as a foot when it is cooled from atmospheric temperature to liquid natural gas temperatures.

Obviously flexible supports can be made for the roof by poles and cables in somewhat the manner that a tent is supported. Poles of the size of large telephone poles would rest on the bottom of the storage zone or lake and would be held vertical by cables fastened to the tops. A network of cables would be supported by the tops of the poles. On this network of cables several feet of a very cheap insulating material such as straw would be placed. Over the insulation an enormous sheet of polyethylene would be placed. On top of the sheet a 6-inch layer of pebbles would be placed to remove the danger of having the roof perforated by a stray bullet.

The preceding design of a roof with flexible supports looks very easy and cheap until one trys to figure out how it is going to be erected. The roof should be as high as possible—probably 40 feet off the ground. In particular the making of a network of cables for the tops of the poles is very expensive by any prior known means. It would greatly simplify matters if the cables could be pulled fairly tight as in the case of tent ropes. However a carefully controlled amount of slack has to be left in all the cables used. If too little slack is allowed not enough flexibility will be provided. If too much slack is provided the poles will not stand vertical and will put heavy forces on the cables.

I have found that the preceding flexible roof and its supports may very conveniently and cheaply be erected by temporarily putting or having water in the storage lake or zone. A pole is floated to where it is to be placed, a heavy piece of concrete is fastened to an end of the pole and the heavy end allowed to sink to the bottom. The light end of the pole floats and the pole is very easily mounted vertically. If the pole is to be held vertical in place, after the water is drained from the lake, by guy wires or cables each with one end fastened to the bottom of the lake, each guy wire or cable is fastened to the bottom of the lake before the water is put in. Then the free end of the cable is attached to a buoy. When water is put in the lake the buoy floats and the free end of the cable can be gotten hold of and fastened to the top of the desired pole.

The men, doing the erecting, work from boats that may be specially designed for the job. For example to string the cables that make the cable network, held up by the poles, on which the insulation rests the men use two scows or flat bottomed boats that sink very slightly in the water. The scows are fastened parallel about six feet apart by beams attached to both boats. The men sit on the beams and let out the cables.

A problem that worried me initially with this invention was that the water must be clear to allow the men to easil;y do much of the work of erection. Also the only convenient source of water in many places was that from a flowing stream and water from such streams normally contains more or less mud. I have found that water from practically any source can be made quite clear for use in a lake. A compound that coagulates mud in the water is added to the water that is to be put in, or is already in, the lake. Then the coagulated mud is settled out of the water as it lays in the lake. Coagulants like ferric salts that produce heavy, fast settling precipitates are preferred.

To prevent the growth of algae or slime in the water of a lake, sodium pentachlorophenate or similar algae or slime preventing agents are added in very small amounts to the water. For more details on how the water can be kept clear very cheaply I refer the reader to anyone skilled in the art of treating industrial waters.

After one perceives how conveniently and cheaply a flexible support system, for the roof of a storage lake or zone in which to store liquified gas, can be erected from boats, many variations of the support system will become obvious. For instance I have mentioned the limiting of the sideways leaning of the vertical poles, holding up the roof, by cables going from the top of the poles to the bottom of the lake. Another method for limiting the sideways leaning is to use, instead of one vertical pole at one location, two poles fastened touching each other at the top but spaced apart at the bottom like a giant inverted capital V. The point where the two poles come together is mounted pointing straight upwards and supports the roof. The two poles forming the inverted V will not only support part of the roof but will limit sideways motion of the roof in the plane containing the two poles.

Of course the inverted V will not limit sideways motion of the roof in the plane which is perpendicular to the plane in which the two poles of the inverted V lies. However we can limit sideways movement of the roof in all directions by having it supported by inverted V's placed in both planes that are mentioned above, each inverted V replacing a single previously mentioned single vertical pole.

The use of inverted V's has been described since the erection of an inverted V poses special problems. Before water is placed in the lake reinforced concrete blocks are put on the bottom of the lake where the two tips of the inverted V will rest. To each block is fastened a cable with the free end fastened to a buoy. When the lake is filled with water the buoys float. The inverted V is floated to above where it is to be erected. For the bottom of each pole of the inverted V the following procedure is carried out. The cable, from the concrete block on which the bottom of the pole will rest, has the buoy removed from the free end and the cable is put through a ring attached to the bottom of the pole.

When both bottoms of the two poles have their cables attached, by pulling on the cables and pushing on the two poles, the bottoms of the two poles and hence the inverted V is put in position.

It is not necessary that the erection of the poles be always done by boat. For example, instead of a single vertical pole to support a section of the roof, a tripod made of three poles fastened together at the top and spread apart at the bottom may be used. Tripods, though expensive, are most conveniently erected before water is placed in the storage zone or lake. However in all cases the networks of cables, supported by the poles, on which the insulated roof lies, is erected or strung by the aid of a man in a boat.

In contrast to prior methods of storing liquefied natural gas my invention allows the construction of storage facilities that hold enormous quantities of liquefied natural gas. Such enormous storage lakes are needed by the gas companies since the U.S. uses nearly 400,000,000 tons of natural gas a year and it takes about 80 cubic feet to store a ton of liquified natural gas. This gas sells to the customers for over six billion dollars a year and gas storage is a very serious problem to the gas industry.

The ability of my invention to increase the area that a storage lake can cover greatly reduces the cost of moving the earth required for making the walls and digging out the bottom of the lake. Because of the limitations and cost of prior roofs, storage zones or rather holes had to be made small in diameter with relatively vertical walls. This required the dirt to be lifted out of the hole in a bucket lifted by a crane. With my invention the storage zone or lake can be made with a very large diameter and it is possible for earth carrying equipment such as self-loading and self-dumping dirt carriers to drive out of the lake.

In fact it is not now necessary to excavate out the storage zone or lake at all since relatively vertical walls are not needed. Storage can now be made above the normal level of the ground by just building walls or dikes around the proposed storage lake site with dirt from any convenient source. When the storage lake is filled with water, so that the supports for the roof can be easily erected, pipes placed in the wet earthen walls are filled with a cold refrigerating liquid which causes the walls to freeze.

Freezing the earthen walls by underground refrigerated pipes has been an item of appreciable expense in prior liquefied natural gas storage zones or holes. This is due to the fact that a storage hole of small diameter has a high ratio of area of walls needed per volume of storage capacity. Since my storage lakes can be made with virtually unlimited diameters the above ratio is greatly reduced and the cost of the frozen earthen walls is less than 1/3, or even much less than, the former cost per cubic foot of storage capacity.

I claim:
1. A method of erecting a support for a roof for a storage zone, in which liquified natural gas is later stored and supported by earth containing frozen water which comprises: putting water in the storage zone, erecting a flexible structure of poles and wires in the storage zone by the help of a man in a boat on the water, resting a roof on top of the flexible structure and removing water from the storage zone after the flexible structure is erected.

2. A method as defined by claim 1, in which water in the walls of the storage zone is frozen while water is in the storage zone.

3. A method as defined by claim 1, in which a substance that coagulates mud is added to the water put in the storage zone so that suspended mud is coagulated and settles from the water.

4. A method of erecting a support for a roof for a storage zone in which liquefied natural gas is later stored which comprises: having water temporarily in the storage zone, erecting a flexible structure of poles and wires in the storage zone by the help of a man in a boat on the water, resting a roof on top of the flexible structure and removing water from the storage zone after the flexible structure is erected.

References Cited

UNITED STATES PATENTS

| | | | |
|---|---|---|---|
| 2,333,316 | 11/1943 | Klingberg | 61.5 |
| 2,961,840 | 11/1960 | Goldtrap | 61.5 X |
| 3,096,902 | 7/1963 | Schroeder | 61.5 |
| 3,159,006 | 12/1964 | Sliepcevich | 61.5 X |

FOREIGN PATENTS 111,569   6/1963   Pakistan.

EARL J. WITMER, *Primary Examiner*.